United States Patent [19]
de la Croi Habimana et al.

[11] Patent Number: 5,210,129
[45] Date of Patent: May 11, 1993

[54] METHOD OF MAKING SILOXANE COMPOSITIONS

[75] Inventors: Jean de la Croi Habimana, Soignies, Belgium; Stephen Westall, Barry, Wales

[73] Assignee: Dow Corning S.A., Seneffe, Belgium

[21] Appl. No.: 844,054

[22] Filed: Mar. 2, 1992

[51] Int. Cl.$^5$ ............................................. C08K 5/24
[52] U.S. Cl. .................................. 524/731; 524/267; 524/268; 528/14; 528/16; 528/18; 528/19; 528/21; 528/23
[58] Field of Search .................. 524/731, 267, 268; 528/14, 16, 18, 19, 21, 23

[56] References Cited

U.S. PATENT DOCUMENTS

| | | | |
|---|---|---|---|
| 4,429,062 | 1/1984 | Pásztor et al. | 524/731 |
| 4,661,556 | 4/1987 | Huebner et al. | 524/745 |
| 4,725,643 | 2/1988 | Burkhardt | 524/789 |
| 5,073,618 | 12/1991 | Westall | 528/13 |
| 5,109,093 | 4/1992 | Rees et al. | 528/14 |
| 5,109,094 | 4/1992 | Rees et al. | 528/14 |

*Primary Examiner*—Melvyn I. Marquis
*Attorney, Agent, or Firm*—Sharon K. Severance

[57] ABSTRACT

A method of making a dispersion of a high viscosity siloxane in a volatile, especially cyclic siloxane, comprises first dispersing organopolysiloxanes having at least 2 Si—OR groups, wherein R is H or alkyl in a volatile siloxane and adding a catalyst which is either a phosphonitrile halide having the general formula $[X(PX_2=N)_nPX_3]^+[MX_{(v-t+1)}R_t]^-$, or a heterogeneous catalyst selected from Li, Mg, Ca, Sr or Ba hydroxide, Na or K borate or phosphate, Rb or Cs carbonate or carboxylates of Rb or Cs wherein M is an element having an electronegativity of from 1.0 to 2.0, R is alkyl, X is halide, n is 1 to 6, v is the valence of M and t is from 0 to (v−1).

20 Claims, No Drawings

METHOD OF MAKING SILOXANE COMPOSITIONS

This invention relates to a method of making siloxane compositions, more specifically compositions wherein high viscosity polysiloxanes are dispersed in volatile, especially cyclic polysiloxanes.

Dispersions of high viscosity polysiloxanes in cyclic polysiloxanes have been known for some time and have been commercially available. These dispersions have a variety of useful characteristics and are important ingredients in many cosmetic compositions. They are generally prepared by physically mixing high viscosity siloxanes into a medium of cyclic siloxanes which have a low viscosity. This method is tedious and requires a lot of energy to ensure a more or less homogeneous dispersion as the high viscosity materials may have a viscosity which amounts to several m²/s. It is possible to dissolve the high viscosity materials in a solvent prior to the dispersion in the cyclic siloxanes in order to reduce the handling viscosity and hence ease the dispersion. However, this leaves the manufacturer with the added disadvantage that a solvent is present and needs to be removed. This disadvantage is all the more serious since the cyclic siloxane materials are volatile to some extent and could be at least partially removed when the solvent is removed.

There is a need for a better method of making a dispersion of high viscosity siloxanes in volatile, especially cyclic siloxanes.

We have now found a method of making such dispersion by selectively condensing hydrolisable siloxanes in the presence of volatile, especially cyclic siloxanes using specified catalysts.

According to the invention there is provided a method of making a dispersion of a high viscosity siloxane in a volatile, especially cyclic siloxane, which comprises making a first dispersion of organopolysiloxanes having at least 2 silicon-bonded groups —OR, wherein R denotes a hydrogen atom or an alkyl group having up to 6 carbon atoms in volatile siloxanes, especially cyclic siloxanes of the general formula $(R'_2SiO)_p$, wherein R' denotes hydrogen or an alkyl, alkenyl or aryl group having up to 8 carbon atoms, p denotes an integer with a value of from 3 to 12, followed by contacting said first dispersion with a catalyst which is either (A) a phosphonitrile halide having the general formula $[X(PX_2=N)_nPX_3]^+[MX_{(v-t+1)}R_t]^-$, or (B) a heterogeneous catalyst selected from lithium hydroxide, magnesium hydroxide, calcium hydroxide, strontium hydroxide, barium hydroxide, sodium borate, sodium phosphate, potassium borate, potassium phosphate, rubidium carbonate, caesium carbonate and carboxylates of rubidium and caesium of the general formula Q.CO.OZ, wherein M is an element having an electronegativity of from 1.0 to 2.0 according to Pauling's scale, Q represents an alkyl group having from 1 to 6 carbon atoms or an alkenyl group having from 2 to 5 carbon atoms, R is an alkyl group having up to 12 carbon atoms, X denotes a halide atom, Z represents Rb or Cs, n has a value of from 1 to 6, v is the valence or oxidation state of M and t has a value of from 0 to (v−1).

Organopolysiloxanes which are suitable for the making of the first dispersion are well known and commercially available materials. They have units of the general formula

wherein $R^2$ denotes a monovalent hydrocarbon atom having up to 8 carbon atoms and z has a value of from 0 to 3. R' may be an alkyl, aryl, aralkyl or alkaryl group. It is, however, preferred that 80% of all $R^2$ groups are lower alkyl groups or aryl groups, most preferably methyl groups. Most preferably substantially all $R^2$ groups are methyl groups. It is also preferred that the value of z is 2 for the majority of units, making the organopolysiloxane a polydiorganosiloxane which is a substantially linear polymer. Preferred polymers may have small amounts of units wherein the value of z is 0 or 1, but such units should not amount to more than 5% of the total number of units in the organopolysiloxane. Units where z equals 3 are end-blocking units and no more than 2 of these units will be present unless some branching in the organopolysiloxane has occurred. The organopolysiloxanes must have at least 2 silicon-bonded groups —OR, wherein R denotes a hydrogen atom or an alkyl group having up to 6 carbon atoms. It is preferred that each terminal silicon atom of the organopolysiloxane has one such silicon-bonded group —OR. Preferred organopolysiloxanes accordingly have the general formula $RO[SiR^2_2O]_mR$, wherein R and $R^2$ are as defined above, and m is an integer with a value of at least 2. Most preferably R is hydrogen. A suitable example is dimethylsilanol endblocked polydimethylsiloxane. The organopolysiloxanes which are useful for making the first dispersion are preferably linear siloxanes with a viscosity of from 20 to 10,000 mm²/s. However, in order to facilitate the mixing process it is preferred to use polymers of slightly lower viscosity, e.g. 20 to 1000 mm²/s, more preferably 50 to 500 mm,/s and most preferably 60 to 200 mm²/s.

Volatile siloxanes are well known and commercially available materials. They are siloxane polymers which are either short chain or cyclic siloxanes, having a viscosity at room temperature of no more than 10 mm²/s and a boiling point under atmospheric pressure of no more than 250° C. Preferred volatile siloxanes are disiloxanes, e.g. hexamethyldisiloxanes. Most preferred are cyclic siloxanes, or mixtures including cyclic siloxanes. It is important that the volatile siloxanes do not have any silicon-bonded groups —OR as defined above, to avoid the polymerisation reaction by condensation of the volatile siloxanes with the organopolysiloxanes having silicon-bonded —OR groups.

Cyclic siloxanes which are useful are also well known and commercially available materials. They have the general formula $(R'_2SiO)_p$ wherein R' denotes hydrogen or an alkyl, alkenyl or aryl group having up to 8 carbon atoms, p denotes an integer with a value of from 3 to 12. Preferably at least 80% of all R' groups are methyl of phenyl groups, most preferably methyl. It is most preferred that substantially all R' groups are methyl groups. Preferably the value of p is from 3 to 6, most preferably 4 or 5. Examples of suitable cyclic siloxanes are octamethyl cyclotetrasiloxane, decamethyl pentacyclosiloxane, cyclopenta (methylvinyl) siloxane, cyclotetra (phenylmethyl) siloxane and cyclopenta methylhydrosiloxane. One particularly suitable commercially available material is a mixture of octamethylcyclotetrasiloxane and decamethylcyclopentasiloxane.

The first dispersion may be made in any convenient way, preferably by mixing the ingredients mechanically. Standard equipment can be used for this dispersion. Suitable equipment includes ribbon blending, homogenisers etc. The ratio of organopolysiloxanes to volatile or cyclic siloxanes in the first dispersion may vary from 1/100 to 10/1. It is, however, preferred that the ratio is from 1/100 to 1/1, more preferably from 1/20 to ¼, most preferably 1/10 to ¼. Higher amounts of volatile siloxanes are particularly preferred, as this allows for the final dispersion to have a viscosity which can easily be handled even when the high viscosity siloxane has a viscosity of several m²/s.

Organopolysiloxanes which are used in the formation of the first dispersion may also include endblocking units. These are e.g. organosilicon compounds which have only one silicon-bonded group —OR per molecule, and may be silanes (e.g. trimethylsilanol, vinyldimethylsilanol) or siloxanes (e.g. α-hydroxydimethylsiloxane).

Suitable catalysts for the method of the invention may be any of a number of materials.

Catalysts (A) which are useful in the method of the invention have a cationic phosphonitrile part and an anionic part which has been derived from a Lewis acid. The cationic phosphonitrile part is a linear oligomeric or polymeric phosphonitrile halide having the general formula $[X(PX_2=N)_n PX_3]^3$ wherein n denotes an integer having a value of from 1 to 6. It is preferred that the halogen X is a chlorine atom. Phosphonitrile halide cationic parts with a value for n which is higher than 6 are less suitable as catalysts. Most preferred are the cationic phosphonitrile halide parts in which the value of n is from 2 to 4. It is particularly preferred that the amount of phosphonitrile halide polymer in which n has a value of 2 is as high as possible as this gives the most active catalyst. Particularly preferred is a catalyst which exclusively consists of compounds according to the above formula in which the value of n is 2.

The anionic part of the catalyst (A) is derived from a Lewis acid and has the formula $[MX_{(v-t+1)}R_t]^-$. Although it is preferred that the value of t is zero alkyl groups may be included. Preferably the Lewis acid based anion contains a halide X which is the same as the halide of the phosphonitrile cationic part, i.e. most preferably a chlorine. The element M of the Lewis acid part is an electropositive element having an electronegativity value according to Pauling's scale of from 1 to 2, preferably from 1.2 to 1.9, most preferably 1.5 to 1.9. Suitable elements are found in Groups Ib, IIa, IIb, IIIa, IVa, IVb, Va, Vb, VIb, VIIb and VIII of the Periodic Table. They include Al, B, Be, Mg, Sb and Si. It is preferred that the difference in electronegative value between the phosphorus atom of the phosphonitrile part of the catalyst and the M element is as large as possible within the preferred range, giving improved catalytic activity when this value is larger. A suitable compound is the one where the Lewis acid derived portion is based on antimony, especially $SbCl_3$ or $SbCl_5$ or aluminium, especially $AlCl_3$. An example of such suitable catalyst (A) has the formula $[Cl_3P=N-(PCl_2=N-)_s-PCl_3]^+[SbCl_6]^-$ wherein s has a value from 1 to 4.

Phosphonitrile halide catalysts (A) which are useful in the method of the invention have been described fully in our copending application No. G.B. 9103656.6 and may be made by reacting in the presence of an aromatic hydrocarbon or of a chlorinated aliphatic or aromatic hydrocarbon, e.g. toluene, sym-tetrachloroethane or 1,2,4-trichlorobenzene, as inert solvent, a phosphorus pentahalide, e.g. phosphorus pentachloride, an ammonium halide, e.g. ammonium chloride and a selected Lewis acid. The reaction may be carried out at a temperature between 100° and 220° C., followed by separating the reaction products from the solids and the volatile components, thus isolating the liquid reaction product. The reagents may be contacted for a period of time which may vary from 2 to 10 hours. It is preferred to continue the reaction for a period in excess of 6 hours. From 0.1 to 1 mole, preferably 0.3 to 0.6 mole of the selected Lewis acid is provided for each mole of phosphorus pentahalide. The catalyst which is useful in the method of the invention can be conveniently stored in solvent, e.g. $CH_2Cl_2$ preferably under a blanket of nitrogen.

The phosphonitrile halide catalysts (A) may be used at a concentration from 1 to 500 ppm by weight based on the total weight of the organopolysiloxanes which are to be polymerised. Preferably from 5 to 150 ppm by weight are used, most preferably from 5 to 50 ppm. The amount of catalyst used in the method of the invention may be reduced when the temperature at which the organosilicon compounds and the catalyst are contacted is increased. The method of the invention may conveniently be carried out at room temperature. The temperature may also be as high as 150° C. Preferably, however, the temperature range is from 10 to 100° C., most preferably from 20° to 50° C.. The higher the temperature the more chance that some of the volatile, especially cyclic siloxanes are lost from the reaction mixture due to their lower boiling point. If higher temperatures are used it is preferred to increase the pressure of the reaction to some extent. Catalysts (A) can easily be neutralised at the end of the polymerisation reaction in order to stabilise the reaction product, e.g. in respect of its viscosity. The neutralisation may be done at any stage of the condensation process, e.g. as soon as the desired viscosity of the organopolysiloxanes is reached. Neutralisation agents for the catalysts are alkaline materials, preferably lightly alkaline materials for example primary, secondary and tertiary amines, ammonia, amides, imides and cyclic diamines. Examples of suitable neutralisation agents are diethylamine, propylamine, ammonia, hexamethyldisilazane, piperazine, methylmorpholine and succinamide.

Due to the low amount of catalyst (A) required and the ease of terminating the condensation reaction Catalyst (A) is particularly useful in both batch and continuous processes. Catalyst (A), though also useful as a rearrangement catalyst for polydiorganosiloxanes, is much more effective as a condensation catalyst. It is, therefore, particularly interesting to use Catalyst (A) in the method of the invention as rearrangement would only occur when the condensation reaction has finished.

A second group of useful catalysts in the method of the invention is concerned with a group of heterogeneous catalysts (B). Because of their heterogeneous nature these catalysts are also particularly adapted for use in processes involving manufacture on a continuous, rather than a batch, basis. Properly employed such so-called "continuous processes" avoid the delays and costs common to batch processing, for example those involved in the charging and discharging of the reaction vessel and separation of the catalyst material from the product. When carrying out the process of this invention in a continuous mode contact between the catalyst material and the organosilicon compound may be achieved by passing the organosilicon compound over or through a bed of the catalyst material. When employing more viscous reactants or products it may be necessary to adjust the porosity of the bed by granulation of the catalyst or other means. We have found that a particularly suitable form of bed for continuous operation can be obtained by depositing the catalyst substance in or on an inert particulate material, for example silica, having a particle size appropriate to the desired porosity of the bed.

A first type of heterogeneous catalyst (B) consists of borates or phosphates of sodium or potassium. Specific examples of such catalysts are $K_2B_4O_7 \cdot 4H_2O$, $K_2BO_2 \cdot xH_2O$, $K_2B_{10}O_{16} \cdot 8H_2O$, $K_3PO_4 \cdot xH_2O$, $Na_2B_4O_7 \cdot 4H_2O$, $NaBO_3 \cdot 4H_2O$, $NaBO_2 \cdot xH_2O$ and $Na_3PO_4 \cdot 12H_2O$. The sodium and potassium compounds may be employed in their anhydrous or hydrated forms. In the case of the phosphate compounds the phosphate anion should not contain hydrogen. Thus, the phosphates of sodium and potassium employed according to this invention do not include the hydrogen phosphates.

A second type of heterogeneous catalyst (B) is any hydroxide of lithium, magnesium, calcium, strontium or barium, the preferred substances being strontium hydroxide and barium hydroxide. The compounds may be employed in their anhydrous or hydrated forms.

A third type of heterogeneous catalyst (B) is a carbonate or carboxylate of rubidium or caesium. In the general formula of the carboxylates Q may be for example methyl, ethyl, propyl, hexyl, vinyl or allyl. Specific examples of catalyst (B) are rubidium carbonate, caesium carbonate, rubidium acetate, caesium propionate, caesium butyrate and rubidium acrylate.

The particle size of the heterogeneous catalyst (B) is not critical. Generally, the smaller the particles the greater the catalytic surface available. However, very fine particle size powders may be more difficult to remove from the condensation product.

In one of its aspects the process of this invention involves contacting the first dispersion with the heterogeneous catalyst (B) at a temperature at which the desired rate of molecular weight increase occurs. The temperatures employed may vary within wide limits for example from about 30° C. to about 200° C.. Reaction at the lower temperatures is, however, normally too slow for commercial purposes and the process is preferably carried out at temperatures within the range from about 70° C. to 150° C.. It is also preferred to accelerate the removal of water formed during the condensation reaction by carrying out the process under reduced pressure, that is, at a pressure less than normal atmospheric and most preferably less than about 0.5 bar. One method of carrying out the process is by means of a batch procedure. For example, the catalyst (B) may be codispersed in the first dispersion and this mixture raised to the required temperature. Alternatively, the first dispersion may be preheated prior to the addition of the catalyst (B). Advantageously the mixture is agitated during the reaction period to maintain the catalyst in suspension. Sufficient catalyst (B) is employed to achieve the desired rate of condensation having regard to the nature and geometry of the processing equipment, temperature and other factors. From considerations of speed of reaction and economy of operation we prefer to employ from about 0.001 to about 8% by weight more preferably 0.1 to 5% of the catalyst (B) based on the weight of the organopolysiloxane in the first dispersion.

Termination of the condensation reaction when using catalyst (B) in the method of the invention may be achieved by lowering the temperature of the mixture, and/or raising the reaction pressure to atmospheric and/or by separation or neutralisation of the catalyst.

The final product obtained by the method of the invention is a dispersion of a high viscosity siloxane having a structure which is dependant on the structure of the organopolysiloxane starting materials used in making the first dispersion. When the preferred organopolysiloxanes are used the final high viscosity siloxanes have the average formula $RO[SiR^2{}_2O]_mSiR^2{}_2$ wherein R and $R^2$ are as defined above and m has a value which is substantially higher than the number of organosiloxane units present in the organopolysiloxanes used to make the first dispersion. The viscosity of the high viscosity siloxanes may be as low as 10,000 mm$^2$/s or as high as several millions of mm$^2$/s, thus forming a siloxane gum. The final product will have a weight ratio of high viscosity siloxane polymer to cyclic siloxane which is very close to the ratio of organopolysiloxane to cyclic siloxanes of the first dispersion. This is due to the fact that the only change in weight is due to the formation and removal of $H_2O$ molecules or ROH molecules upon condensation or the organopolysiloxanes. Traces of catalyst which may remain in the final dispersion may be removed by known methods, i.e. filtration, evaporation etc.

There now follow a number of examples which illustrate the invention. All parts, ratios and percentages are by weight unless otherwise stated.

EXAMPLE 1

0.12 mole of $PCl_5$, 0.08 mole of $NH_4Cl$ and 0.04 mole of $SbCl_{15}$ were allowed to react together in 60 ml of sym-tetrachloroethane at its refluxing temperature of 147° C. for 3.5 hours. After the reaction the solution was filtered to remove insoluble compounds, followed by removal of the solvent under reduced pressure. A bright yellow liquid was obtained which slowly crystallised upon cooling. The resulting catalyst was analysed by NMR (nuclear magnetic resonance) spectroscopy. It was found to be a 50/50 mixture of $[PCl_3=N-PCl_2=N-PCl_3]^+[SbCl_6]^-$ and $[PCl_3=N-(PCl_2=N-)_2-PCl_3]^+[SbCl_6]^-$ while no $[PCl_6]^-$ anion was observed. 50 parts of dimethylsilanol endblocked polydimethylsiloxane were mixed with 50 parts of octamethyltetracyclosiloxane and homogenised into a first dispersion. 48 ppm based on the weight of the polydimethylsiloxane of the catalyst as prepared above were added and the mixture allowed to react at 20° C. under reduced pressure of 20 mm Hg. After 15 minutes the reaction was halted by neutralising the catalyst with 50 ppm of diethylamine. The finished dispersion consisted of 50 parts of a high viscosity siloxane having a viscosity of at least 500,000 mm$^2$/s and thus forming a siloxane gum in 50 parts of unchanged octamethyl cyclotetrasiloxane, giving the dispersion an overall viscosity of 12,000 mm$^2$/s.

EXAMPLE 2

13 parts of an α,w-hydroxyl dimethylpolysiloxane having an average structure of $H[OSi(CH_3)_2]_nOH$, wherein n has the average value of 32, were mixed with 83 parts of a mixture of octamethylcyclotetrasiloxane and decamethylpentacyclosiloxane. The mixture was heated to reflux temperature (about 180° C.) at atmospheric pressure in the presence of 2% of anhydrous potassium carbonate, based on the weight of the dimethylpolysiloxane. Condensation water was collected in a Dean & Stark apparatus. After 7 hours the reaction was stopped. The catalyst was filtered out and the final product was analysed by gel permeation chromatography. This analysis showed that the polydimethylsiloxane had condensed to form high viscosity siloxanes with an average molecular weight of 196,464 and that the cyclic siloxanes were unreacted. The final product was a clear dispersion of the high viscosity siloxanes in the cyclic siloxanes.

EXAMPLE 3

15 parts of an α,w-hydroxyl dimethylpolysiloxane having an average structure of $H[OSi(CH_3)_2]_nOH$, wherein n has the average value of 34, were mixed with 85 parts of a mixture of octamethylcyclotetrasiloxane and decamethylpentacyclosiloxane. The mixture was heated to reflux temperature (about 180° C.) at atmospheric pressure in the presence of 0.7% of barium hydroxide octahydrate based on the weight of the dimethylpolysiloxane. Condensation water was collected in a Dean & Stark apparatus. After 45 minutes the reaction was stopped. The catalyst was filtered out and the final product was analysed by gel permeation chromatography. This analysis showed that the polydimethylsiloxane had condensed to form high viscosity siloxanes with an average molecular weight of 245,000 and that the cyclic siloxanes were unreacted. The final product was a clear dispersion of the high viscosity siloxanes in the cyclic siloxanes.

EXAMPLE 4

50 parts of an α,w-hydroxyl dimethylpolysiloxane having an average structure of $H[OSi(CH_3)_2]_nOH$, wherein n has the average value of 34, were mixed with 50 parts of a mixture of octamethylcyclotetrasiloxane and decamethylpentacyclosiloxane. The mixture was heated to reflux temperature (about 200° C.) at atmospheric pressure in the presence of 5% of strontium hydroxide octahydrate based on the weight of the dimethylpolysiloxane. Condensation water was collected in a Dean & Stark apparatus. After 2 hours the reaction was stopped. The catalyst was filtered out and the final product was analysed by gel permeation chromatography. This analysis showed that the polydimethylsiloxane had condensed to form high viscosity siloxanes with an average molecular weight of 170,258 and that the cyclic siloxanes were unreacted. The final product was a clear dispersion of the high viscosity siloxanes in the cyclic siloxanes.

EXAMPLE 5

15 parts of an α,w-hydroxyl dimethylpolysiloxane having an average structure of $H[OSi(CH_3)_2]_nOH$ wherein n has the average value of 34, were mixed with 85 parts of a mixture of octamethylcyclotetrasiloxane and decamethylpentacyclosiloxane. The mixture was heated to reflux temperature (about 130° C.) at 260 mm Hg pressure in the presence of 5% of rubidium carbonate based on the weight of the dimethylpolysiloxane. Condensation water was collected in a Dean & Stark apparatus. After 8 hours the reaction was stopped. The catalyst was filtered out and the final product was analysed by gel permeation chromatography. This analysis showed that the polydimethylsiloxane had condensed to form high viscosity siloxanes with an average molecular weight of 283,796 and that the cyclic siloxanes were unreacted. The final product was a clear dispersion of the high viscosity siloxanes in the cyclic siloxanes.

EXAMPLE 6

15 parts of an α,w-hydroxyl dimethylpolysiloxane having an average structure of $H[OSi(CH_3)_2]_nOH$ wherein n has the average value of 34, were mixed with 85 parts of a mixture of octamethylcyclotetrasiloxane and decamethylpentacyclosiloxane. The mixture was heated to reflux temperature (about 180° C.) at atmospheric pressure in the presence of 5% of tri-sodium orthophosphate dodecahydrate based on the weight of the dimethylpolysiloxane. Condensation water was collected in a Dean & Stark apparatus. After 8 hours the reaction was stopped. The catalyst was filtered out and the final product was analysed by gel permeation chromatography. This analysis showed that the polydimethylsiloxane had condensed to form high viscosity siloxanes with an average molecular weight of 266,390 and that the cyclic siloxanes were unreacted. The final product was a clear dispersion of the high viscosity siloxanes in the cyclic siloxanes.

EXAMPLE 7

50 parts of an α,w-hydroxyl dimethylpolysiloxane having an average structure of $H[OSi(CH_3)_2]_nOH$, wherein n has the average value of 34, were mixed with 50 parts of a mixture of octamethylcyclotetrasiloxane and decamethylpentacyclosiloxane. The mixture was heated to reflux temperature (about 100° C.) at 75 mm Hg pressure in the presence of 5% of sodium metaborate octahydrate, based on the weight of the dimethylpolysiloxane. Condensation water was collected in a Dean & Stark apparatus. After 8 hours the reaction was stopped. The catalyst was filtered out and the final product was analysed by gel permeation chromatography. This analysis showed that the polydimethylsiloxane had condensed to form high viscosity siloxanes with an average molecular weight of 266,390 and that the cyclic siloxanes were unreacted. The final product was a clear dispersion of the high viscosity siloxanes in the cyclic siloxanes.

EXAMPLES 8-11 x parts of an α,w-hydroxyl dimethylpolysiloxane having an average structure of $H[OSi(CH_3)_2]_nOH$, wherein n has the average value of 34, were mixed with y parts of a mixture of octamethylcyclotetrasiloxane and decamethylpentacyclosiloxane. The mixture was heated to reflux temperature (about 130° C.) at 300 mm Hg pressure in the presence of 5% of lithium hydroxide monohydrate, based on the weight of the dimethylpolysiloxane. Condensation water was collected in a Dean & Stark apparatus. After 2 hours the reaction was stopped. The catalyst was filtered out and the final product was analysed by gel permeation chromatography. This analysis showed that the polydimethylsiloxane had condensed to form high viscosity siloxanes with an average molecular weight of z and that the cyclic siloxanes were unreacted. The final product was a clear dispersion of the high viscosity siloxanes in the cyclic siloxanes. The values of x, y and z are given in the table below.

| Example | x | y | z |
| --- | --- | --- | --- |
| 8 | 15 | 85 | 80,000 |
| 9 | 35 | 65 | 145,000 |

-continued

| Example | x | y | z |
| --- | --- | --- | --- |
| 10 | 50 | 50 | 245,000 |
| 11 | 75 | 25 | 349,000 |

That which is claimed is:

1. A method of making a dispersion of a high viscosity siloxane in a volatile siloxane, which comprises
   (I) dispersing at least one organopolysiloxane having at least 2 silicon-bonded groups —OR, wherein R is selected from the group consisting of hydrogen and alkyl groups having up to 6 carbon atoms, in a volatile siloxane, followed by
   (II) contacting the dispersion of (I) with a catalyst which is selected from the group consisting of
      (A) a phosphonitrile halide having the general formula $\{X(PX_2=N)_nPX_3\}^+\{MX_{(v-t+1)}R_t\}^-$ and
      (B) a heterogeneous catalyst selected from the group consisting of lithium hydroxide, magnesium hydroxide, calcium hydroxide, strontium hydroxide, barium hydroxide, sodium borate, sodium phosphate, potassium borate, potassium phosphate, rubidium carbonate, caesium carbonate, carboxylates of rubidium and carboxylates of caesium, said carboxylates having the general formula Q.CO.OZ wherein M is an element having a electronegativity of from 1.0 to 2.0 according to Pauling's scale,
   Q is selected from alkyl groups having from 1 to 6 carbon atoms or alkenyl groups having from 2 to 5 carbon atoms,
   R is an alkyl groups having up to 12 carbon atoms,
   X denotes a halide atom,
   Z is selected from Cs or Rb,
   n has a value of from 1 to 6,
   v is the valence or oxidation state of M and
   t has a value of from 0 to (v−1).

2. A method according to claim 1 wherein the volatile siloxane is a cyclic siloxane of the general formula $(R'_2SiO)_p$ wherein R' is selected from the group consisting of hydrogen, alkyl having up to 8 carbon atoms, alkenyl having up to 8 carbon atoms and aryl having up to 8 carbon atoms and p in an integer with a value of from 3 to 12.

3. A method according to claim 2 wherein substantially all groups R' are methyl groups.

4. A method according to claim 1 wherein the organopolysiloxane is a substantially linear siloxane polymer having on each terminal siloxane unit a silicon-bonded group OH.

5. A method according to claim 2 wherein the organopolysiloxane is a substantially linear siloxane polymer having on each terminal siloxane unit a silicon-bonded group OH.

6. A method according to claim 4 wherein the viscosity of the organopolysiloxane is from 50 to 500 $mm^2/s$.

7. A method according to claim 5 wherein the viscosity of the organopolysiloxane is from 50 to 500 $mm^2/s$.

8. A method according to claim 1 wherein the weight ratio of organopolysiloxane to volatile siloxane in the first dispersion is from 1/20 to ½.

9. A method according to claim 2 wherein the weight ratio of organopolysiloxane to cyclic siloxane in the first dispersion is from 1/20 to ½.

10. A method according to claim 1 wherein the catalyst is neutralised when the high viscosity siloxane has a viscosity of at least 10,000 $mm^2/s$.

11. A method according to claim 1 wherein catalyst (A) is present in an amount of from 5 to 50 ppm by weight based on the weight of the organopolysiloxane.

12. A method according to claim 2 wherein catalyst (A) is present in an amount of from 5 to 50 ppm by weight based on the weight of the organopolysiloxane.

13. A method according to claim 5 wherein catalyst (A) is present in an amount of from 5 to 50 ppm by weight based on the weight of the organopolysiloxane.

14. A method according to claim 11 wherein M denotes Sb and n has a value of 2.

15. A method according to claim 1 wherein catalyst (B) is present in the form of a catalyst bed in an amount of from 0.1-5% by weight based on the weight of the organopolysiloxane.

16. A method according to claim 2 wherein catalyst (B) is present in the form of a catalyst bed in an amount of from 0.1-5% by weight based on the weight of the organopolysiloxane.

17. A method according to claim 5 wherein catalyst (B) is present in the form of a catalyst bed in an amount of from 0.1-5% by weight based on the weight of the organopolysiloxane.

18. A dispersion of a high viscosity siloxane in a volatile siloxane, made according to the method of claim 1.

19. A dispersion of a high viscosity siloxane in a cyclic siloxane made according to the method of claim 2.

20. A dispersion of a high viscosity siloxane in a volatile siloxane made according to the method of claim 5.

* * * * *